3,467,850
CYCLOCONVERTER CONTROL CIRCUIT
Paul Christiansen, Novelty, Ohio, and Carmelo J. Amato, Lavonia, Mich., assignors to Lear Siegler, Inc., Santa Monica, Calif., a corporation of Delaware
Filed Mar. 18, 1968, Ser. No. 718,301
(Filed under Rule 47(a) and 35 U.S.C. 116)
Int. Cl. H02m 1/08
U.S. Cl. 321—18        6 Claims

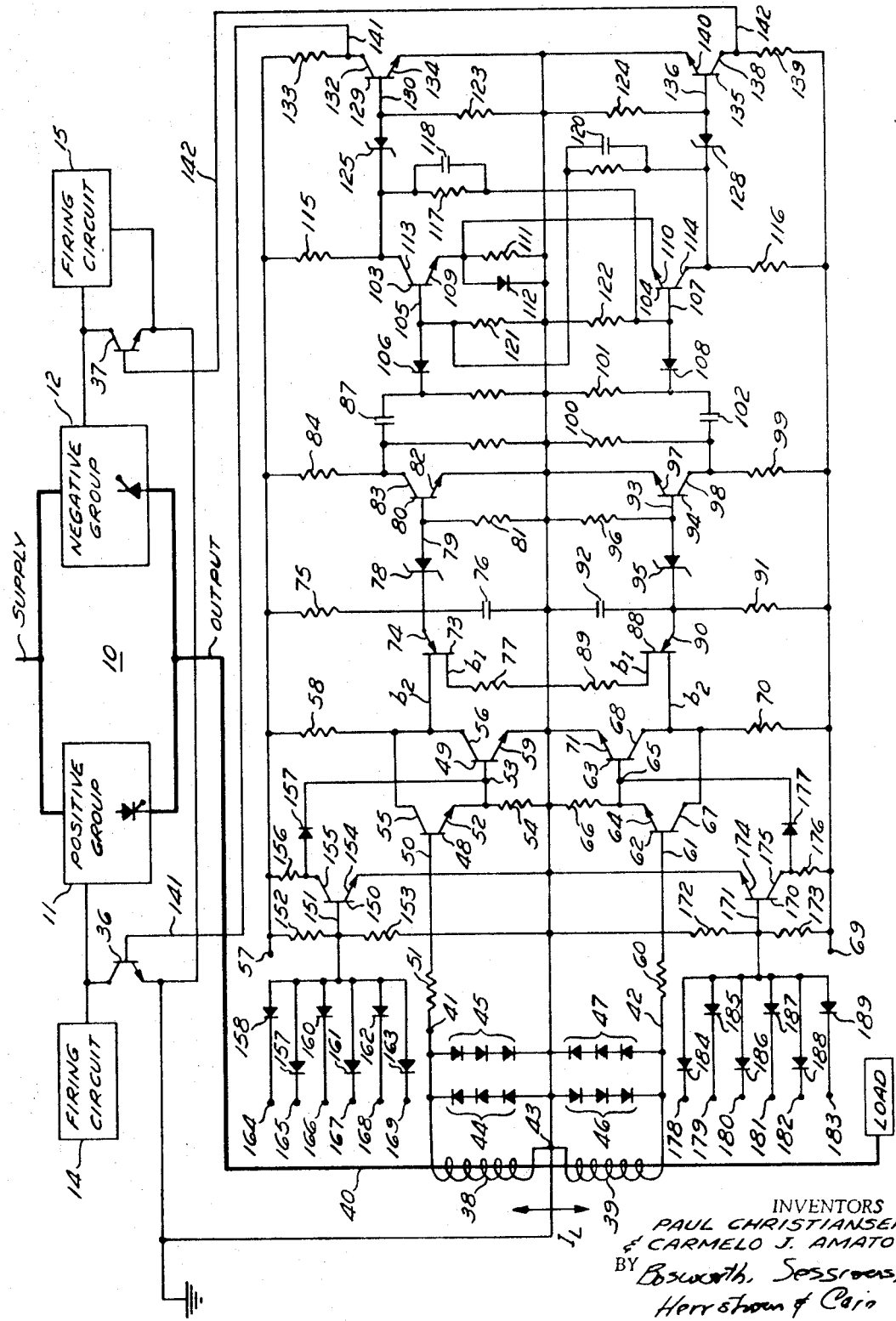

ABSTRACT OF THE DISCLOSURE

Circuit means for selectively switching positive and negative current-conducting groups within a cycloconverter in accordance with the cycloconverter alternating output current levels or an alternating current corresponding thereto. In particular, an improved circuit for preventing intergroup currents during switching and for providing relatively distortion-free output current by insuring minimum periods of no output current during switching.

Background of the invention

A cycloconverter characteristically comprises two major elements, a positive current group and a negative current group, connected in parallel between a supply and the cycloconverter output which is connected to a load. As is well known, each group may consist of a number of rectifying and switching devices, such as mercury arc rectifiers, silicon controlled rectifiers, or thyratrons, connected in some well-known rectifier configuration. The output current from each group can flow in only one direction. Therefore, in order to supply an alternating output current, the positive and negative groups must be connected back-to-back with respect to the output circuit so that each group may alternately provide a half cycle of each full cycle of output current.

It is well known in the cycloconverter art that instantaneous voltage differences may exist between the positive and negative groups of switching and rectifying devices. These voltage differences produce deleterious currents which circulate between the positive and negative groups within the cycloconverter if steps are not taken to suppress and/or reduce them or to positively interrupt their paths. Intergroup circulating currents have been reduced or limited in the past by chokes employed in the current paths between groups, but such means do not eliminate the undesirable currents.

Theoretically, intergroup circulating currents can be eliminated by insuring that only one current-conducting group is permitted to conduct at a time. This can be accomplished by blocking, diverting or otherwise suppressing the switching pulses supplied to the rectifying and switching devices of one group while permitting the switching pulses supplied to the other group of rectifying and switching devices to activate or fire them in the usual sequence known in the cycloconverter art.

In order to provide an alternating current output, the positive and negative groups of switching and rectifying devices must conduct alternately and, therefore, the means for preventing intergroup circulating currents in a cycloconverter by blocking, diverting or otherwise blanking the firing pulses provided for the two groups must act alternately with respect to the two groups. This function will be referred to in the description that follows as alternating group blanking or group switching.

This invention deals with alternating group blanking as described above which is activated or controlled by current information received from the two current-carrying groups. For example, circuit means for providing alternating group blanking or switching acts generally to blank firing pulses supplied to the positive group while the negative group is carrying current and to blank firing pulses supplied to the negative group while the positive group is carrying current. In theory, such an arrangement provides alternations in the group switching whenever the output current of the cycloconverter reaches zero current.

Alternating group switching timed in accordance with zero current in the alternating output current has certain limitations in practice, however, which produce undesirable results in the cycloconverter operation. One of these problems is inherent in a type of switching and rectifying device commonly employed in cycloconverter current-conducting groups. Such devices are of the type which are turned on by a control element which then loses control and is then unable to turn them off, such as thyratron or silicon controlled rectifiers. For convenience, all such devices will be referred to hereafter merely as SCR's. It is thus possible, when alternation in the group blanking occurs, that the blanked or non-conducting group may be turned on before all of the switching and rectifying devices of the other group have regained blocking control through changes in their anode-cathode voltages even though the firing pulses to the control elements of the switching and rectifying devices have been suppressed, diverted or otherwise blanked.

This problem and a circuit providing a solution are disclosed and claimed in United States Patent No. 3,320,-514, granted May 16, 1967.

The circuit of the patent referred to provides alternating blanking and unblanking signals to the two current-conducting groups. The timing of the signals is based upon information derived solely from the cycloconverter output current. Each blanking signal is applied to divert or blank the firing signals from the appropriate current-conducting group substantially upon the crossing of a sensing threshold, e.g. approximately zero current, by the output current level. Each unblanking signal is applied a predetermined fixed time after the application of its corresponding blanking signal. During the period of this time delay, both groups are blanked and no current is supplied by them to the cycloconverter output.

This "dead time," however, can prevent short circuits and intergroup circulating currents only if the length of the delay exceeds the time required for the last-to-be-fired SCR of the group just blanked to conduct and then recover its blocking state. This is the maximum time that both current-conducting groups need to be blocked to insure that there will be no intergroup circulation currents. The minimum time required would occur if the group were blanked an instant before the next SCR is to be fired. If the "dead time" is any less than the maximum time, however, the possibility exists that an SCR of the group just blanked will still be conducting or not have recovered its blocking state when the other group is unblanked and the first of its SCR's conducts so that a short circuit path is provided for intergroup circulating currents. Such a delay provides substantial flat spots in the output current that are deleterious to the performance of a cycloconverter and/or the load supplied by it.

Summary of the invention

Briefly, the invention is embodied in a circuit which controls the switching of the positive and negative current-conducting groups in a cycloconverter to provide a relatively distortion-free output current and which prevents short circuits and intergroup circulating currents between them by providing variable length periods of non-conduction when the output current is switched from one group to the other. This is accomplished by blanking the conducting group when the alternating output current is substantially zero and then delaying the unblanking of the non-conducting group a variable length of time thereafter, depending upon the time since the last SCR was fired in the previously conducting and just blanked group. The period of time between the blanking of one group and the unblanking of the other is, therefore, variable and dependent upon both the time the output current becomes substantially zero and the time since the last SCR in the group last conducting was fired.

Brief description of the drawings

The drawings comprise a circuit diagram of an embodiment described below.

Description of a preferred embodiment

The accompanying circuit diagram and its description below disclose a preferred embodiment of the invention and illustrate its relationship to a conventional cycloconverter. As shown, cycloconverter 10 comprises inversely parallel-connected positive and negative current-conducting groups 11 and 12, respectively, and their respectively associated firing circuits 14 and 15. A switching transistor 36 is associated with positive group 11 and its firing circuit 14; and, another switching transistor 37, with negative group 12 and its firing circuit 15. Transistors 36 and 37 are arranged to divert from their associated group to ground through their collector-emitter circuits the firing signals from their associated firing circuits and, thus, permit the current-conducting groups 11 and 12 to be blanked selectively as desired.

On the left side of the circuit diagram is an alternating current sensor 38 comprising a current transformer having a secondary winding 39 inductively associated with cycloconverter output conductor 40. Winding 39 is provided with output terminals 41 and 42 at its opposite ends and a center tap terminal 43. Serially-connected sets of diodes 44 and 45 are connected in opposite directions between output terminal 41 and center tap 43, and similarly connected and arranged sets 46 and 47 are connected between output terminal 42 and center tap 43. These diode sets preferably limit the output voltage appearing between the output terminals of winding 39 by the sum of the forward voltage drops of the diodes making up the set involved.

Secondary winding 39 is arranged so that pulses of a given polarity with respect to center tap 43 alternately appear at output terminals 41 and 42 in response to the cycloconverter alternating output current $I_L$ sensed in output conductor 40. A positive pulse appears at output terminal 42 when positive group 11 is conducting and providing the other half cycle of alternating output current $I_L$. As a result of diode sets 44–47, the voltage pulses appearing at the output terminals 41 and 42 are generally clipped sinusoidal pulses resembling square wave, low amplitude pulses.

Current sensor 38, as particularly described above and as shown in the drawing, comprises a preferred means for supplying alternating trigger pulses to the alternating group switching circuit means. However, other suitable sensing means can be used.

The physical arrangement of the circuit connected to the output terminals of current sensor 38 is first described below and followed by an explanation of its operation. Output terminal 41 of current sensor 38 is connected to an amplifier comprising transistors 48 and 49 arranged in a Darlington connection. Base 50 of transistor 48 is connected to terminal 41 through resistor 51. Emitter 52 of transistor 48 is connected to base 53 of transistor 49 and to ground and center tap 43 of secondary winding 39 through resistor 54. Collectors 55 and 56 of transistors 48 and 49, respectively, are connected together and to a source 57 of positive direct current potential through resistor 58. Emitter 59 of transistor 49 is connected to ground.

The other output terminal 42 is connected through resistor 60 to base 61 of transistor 62. Transistor 62 is coupled with transistor 63 in a Darlington connection with the emitter 64 of transistor 62 connected to the base 65 of transistor 63 and to ground through resistor 66. Collectors 67 and 68 of transistors 62 and 63, respectively, are connected together and to a source 69 of direct current potential through resistor 70. Emitter 71 of transistor 63 is connected to ground.

The output signal of the amplifier associated with output terminal 41 appearing at common collector connection of transistors 48 and 49 is connected to base 2 of unijunction transistor 73. Emitter 74 is connected to the junction between an RC combination of resistor 75 and capacitor 76 which, in turn, are connected to a positive source 57 of direct current potential and to ground, respectively. Base 1 of unijunction transistor 73 is connected through resistor 77 to ground. Emitter 74 of unijunction transistor 73 and the junction of the RC combination 75–76 are connected through Zener diode 78 to base 79 of switching transistor 80. Base 79 is connected to ground through resistor 81 and emitter 82 is connected directly to ground. Collector 83 is connected through resistor 84 to a source 57 of positive direct current potential. Collector 83 of switching transistor 80 is connected to a differentiating circuit comprised of resistors 85 and 86 and capacitor 87.

The common collector connection of transistors 62 and 63 is connected to an identical circuit arrangement as is the common collector connection of transistors 48 and 49 described above. Briefly, base 2 of unijunction transistor 88 is connected to the common collector connection, base 1 is connected through resistor 89 to ground and emitter 90 is connected to the junction between an RC combination comprising resistor 91 and capacitor 92 which, in turn, are connected to a source 69 of positive direct current potential and to ground, respectively. The junction between the RC combination 91–92 is connected to base 93 of switching transistor 94 through Zener diode 95. Base 93 is also connected through resistor 96 to ground. Emitter 97 is connected directly to ground and collector 98 is connected to a source 69 of positive direct current potential through resistor 99. A differentiating circuit consisting of resistors 100 and 101 and capacitor 102 is connected to collector 98 as shown.

The differentiating networks comprising RC combinations 85–87 and 100–102 are connected to the inputs of a bistable multivibrator made up of a pair of NPN switching transistors 103 and 104. The base 105 of transistor 103 is connected to the junction of RC combination 86–87 through diode 106 arranged to conduct away from the transistor base. Base 107 of transistor 104 is similarly connected to the junction of RC combination 101–102 through diode 108 arranged to conduct away from the transistor base. Emitter 109 and emitter 110 of the two transistors are connected together and to ground through a parallel arrangement of resistor 111 and diode 112 arranged to conduct toward ground potential. Collectors 113 and 114 of transistors 103 and 104, respectively, are connected through resistors 115 and 116 to sources 57 and 69 of positive direct current potential. The conventional multivibrator cross connections consist of the parallel combination of resistor 117 and capacitor 118 connected between collector 113 of transistor 103 and base 107 of transistor 104 and the parallel combination of resistor 119 and capacitor 120 connected between collector 114 of transistor 104 and base 105 of transistor 103. In addition, base 105 is connected to ground through resistor 121 and base 107 is connected to ground through resistor 122.

The bistable multivibrator described above is of generally conventional configuration and employs a pair of NPN switching transistors arranged so that the multivibrator is switched from one state to another by a negative trigger pulse applied to the base of the on or saturated transistor.

The collector outputs of the two switching transistors 103 and 104 of the bistable multivibrator section supply the activating signals for controlling the blanked and unblanked condition of the firing singals provided for the two current conducting groups of a cycloconverter. The multivibrator insures the general objective of permitting only one of the two groups to conduct at a time because of the inherent quality of multivibrators which involves the control of each of the switches by the other and prescribes that, at any given time, opposite conditions must exist in the two switches.

The output of the multivibrator comprising collector 113 of transistor 103 is connected to an NPN switching transistor 129 through its base 130 and Zener diode 125 arranged to conduct away from the transistor 129. Source 57 of positive direct current potential is connected to collector 132 through resistor 133, emitter 134 and base 130 are connected to ground, the latter through resistor 123.

Another NPN transistor 135 is connected to the other multivibrator output comprising collector 114 of transistor 104. Base 136 of transistor 135 is connected through Zener diode 128 as shown and to ground through resistor 124. Source 69 of positive direct current potential is applied to collector 138 through resistor 139 and emitter 140 is connected to ground.

Output signals alternately appear at collectors 132 and 138 of tarnsistors 129 and 135, respectively, in accordance with changes in state or switching of the bistable multivibrator. Output signals may appear at both collectors at the same time, though both may not be absent or off at the same time as will be described below.

As used in conjunction with a cycloconverter, collector 132 is connected by conductor 141 to the base of transistor 36 and collector 138 of transistor 135 is connected by conductor 142 to the base of transistor 37. As explained more fully below in connection with the circuit operation and its relationship to the cycloconverter, an output signal appears at collector 132 when negative group 12 of the cycloconverter is providing output current and at collector 138 of transistor 135 when positive group 11 is providing output current. In this manner, these alternating output signals are employed to divert, suppress or otherwise blank the firing signals intended for positive group 11 when negative group 12 is conducting and vice versa.

In addition to current sensor 38, an input for controlling the conduction of Darlington-connected transistor pairs 48–49 and 62–63 is provided by those parts of the circuit described next.

An NPN switching transistor 150 is provided having its base 151 connected between positive direct current source 57 and ground by resistors 152 and 153. Its emitter 154 is connected directly to ground and its collector 155, to positive D.C. source 57 through resistor 156 as well as to base 53 of amplifying transistor 49 through a unidirectional impedance or diode 157 arranged to conduct toward transistor 49. Base 151 or transistor 150 is driven from a plurality of unidirectional impedances or diodes 158 through 163, each having its anode connected to base 151. The cathodes of these six diodes comprise input terminals 164 through 169 for receiving the firing signals provided negative conducting group 12. As shown, it is contemplated that negative group 12 be a conventional full wave bridge arrangement of six SCR's adapted to be fired by negative trigger pulses for providing one half wave of a single-phase output from a three-phase supply in a well-known manner. If more or less SCR's make up negative group 12, a like number of input terminals and unidirectional impedances are used. There must be an input terminal and unidirectional impedance path for each SCR in the negative group to conduct to base 151 of transistor 150 every firing signal or signal corresponding thereto furnished the SCR's of negative group 12. If the firing signals information is in the form of positive pulses, appropriate changes that will be understood by those skilled in the art to which the subject pertains should be made in the circuit.

Corresponding to switching transistor 150 and its connections just described, is an NPN switching transistor 170 connected to Darlington transistor pair 62–63 and associated with positive current-conducting group 11. Base 171 of transistor 170 is connected between positive direct current source 69 and ground by resistors 172 and 173. Emitter 174 is connected directly to ground and collector 175 to positive D.C. source 57 through resistor 176 as well as to base 65 of transistor 63 through unidirectional impedance or diode 177 arranged to conduct toward transistor 63. A plurality of input terminals 178 through 183 are each connected to base 171 through unidirectional impedances 184 through 189. These input terminals are adapted to receive the firing signals or signals corresponding thereto provided the SCR's comprising positive current-conducting group 11. Although six input terminals have been shown connected to transistor 170, more or less may be employed to correspond to the number of SCR's making up positive group 11. The unidirectional impedances are poled to accommodate negative firing pulses, although positive pulses may be employed with appropriate polarity changes in the circuit.

In describing the operation of the alternating group switching circuit means, let it be assumed that current provided by positive group 11 of cycloconverter 10 is conducting. In response thereto, a positive voltage pulse appears at output terminal 42 of current sensor 38 and is applied to base 61 of transistor 62, turning on the Darlington-connected transistors 62 and 63. Conduction by transistor 63 places base 2 of unijunction transistor 88 essentially at ground potential. As a consequence, emitter 90 is in a low impedance state, resulting in a very low or nearly zero voltage across capacitor 92. At this point, transistor 94 is off for lack of sufficient base drive. A negative current pulse appears at output terminal 41 of current sensor 38 and transistors 48 and 49 are off.

When the output current supplied by positive group 11 falls to zero, Darlington-connected transistors 62 and 63 immediately turn off to bias base 2 of unijunction transistor 88 to a high potential. The impedance seen at emitter 90 of unijunction transistor 88 increases and capacitor 92 begins charging through resistor 91 toward the potential of source 69 of direct current voltage. After a time delay dependent upon the time constant of the RC combination 91–92, capacitor 92 reaches the breakdown voltage of Zener diode 95, the diode conducts and turns on transistor 94. In the conducting state, collector 98 of transistor 94 falls essentially to ground potential. The change in potential of collector 98 is differentiated by the succeeding RC network and the discharge of capacitor 102 produces a negative voltage spike constituting a trigger signal to the base 107 of multivibrator transistor switch 104 time delayed after the positive output current falls to zero.

The turning off of transistor 104 by the negative voltage spike applied to its base 107 increases the potential of its collector 114. When the potential of collector 114 exceeds the breakdown voltage of Zener diode 128, a signal is supplied base 136 which turns on transistor 135. The potential of collector 138 falls substantially to zero potential, removing the base drive by means of conductor 142 from switching transistor 37. In this manner, switching transistor 37 is turned off, permitting the pulses supplied by firing circuit 15 to render negative current group 12 conducting.

The turning off of multivibrator transistor 104 as explained above turns on transistor 103. When transistor 103 conducts, the potential of collector 113 falls. The cathode potential of Zener diode 125 falls below breakdown voltage and switching transistor 129 is rendered non-conducting. When switching transistor 129 is non-conducting, the potential appearing at its collector 132 is high enough to turn on transistor 36 connected to it by conductor 141. When transistor 36 is conducting, the firing pulses supplied by firing circuit 14 are diverted from positive group 11 so that it is effectively rendered non-conducting.

It will be apparent that, when a negative voltage spike is applied to base 107 of transistor 104 to trigger the multivibrator, it brings about the blanking of the positive current-conducting group 11 and the unblanking of the negative current-conducting group 12. It is an important feature of this invention that this blanking and unblanking is time delayed from the time the current of the positive group reaches zero by a variable amount and in a manner described below.

The effective length of this time delay is varied in the following manner by the operation of transistor 170 and its associated inputs receiving firing signal information from all of the SCR's making up positive group 11. When the output current supplied by positive group 11 goes to zero, timing capacitor 92 starts charging through resistor 91 and begins a time delay unit. If an SCR of positive group 11 is fired during this time delay unit, however, this fact is sensed through that one of the input terminals 178–183 connected to the control electrode of the SCR fired. As a result normally biased-on switching transistor 170 is triggered off, at least briefly, turning transistor 63 on. Transistor 63 was previously turned off when the positive output current went to zero. As before, when transistor 63 conducts, base 2 of unijunction transistor 88 is placed at substantially ground potential and emitter 90 assumes a low impedance state. Capacitor 92 then discharges to ground through unijunction transistor 88 and is reset at a discharged condition beginning the time delay unit all over again.

In this manner, a period of time is measured which varies in length in accordance with the time relationship between the occurence of zero output current in the positive cycloconverter group and the firing of the last SCR of the same group. The variable delay is related to the time required for this last SCR to be fired, to conduct, and to regain its blocking state.

The charging time of capacitor 92 through resistor 91 is the minimum time delay experienced between the occurrence of zero current and the blanking and unblanking of the current-conducting groups. This minimum delay occurs when no SCR's of the positive current-conducting group 11 fire during the charging time of capacitor 92. This charging time is preferably the shortest that will permit any one of the SCR's comprising the cycloconverter current-conducting groups to be fired, conduct, and to regain its blocking state.

The maximum delay will occur when an SCR of positive current-conducting group 11 fires just before the charge on capacitor 92 reaches the breakdown voltage of Zener diode 95, discharging and resetting capacitor 92 for another full minimum unit of time delay.

From the foregoing, it will be apparent that the "dead time" in the cycloconverter output current, beginning when current delivered by positive group 11 falls to zero and ending when negative group 12 is unblanked and permitted to deliver negative current to the output circuit, is reduced to the shortest period consistent with good operation and that will not permit intergroup short circuits and circulating currents. The length of the "dead time" is appropriately varied each and every half cycle of cycloconverter output to fit the pertinent conditions of the SCR's in the group to be blanked.

The operation of the circuit embodying this invention when the current delivered by negative group 12 of the cycloconverter falls to zero is similar to that described above in connection with positive group 11.

Darlington-connected transistors 48 and 49 connected to output terminal 41 of current sensor 38 and the circuit elements following, such as unijunction transistor 73, RC combination 75–76, Zener diode 78, switching transistor 80 and the differentiating network, are responsive to that portion of the output current $I_L$, provided by negative group 12 of cycloconverter 10. When it crosses zero going positive, capacitor 76 begins charging through resistor 75 from source 57 of positive direct current potential. When the charge on capacitor 76 reaches the breakdown voltage of Zener diode 78, switching transistor 80 fires and the differentiating circuit connected to its collector output 83 produces a negative voltage spike for triggering switching transistor 103 of the multivibrator. The negative voltage spike appears an interval of time after the output current $I_L$ supplied by negative current-conducting group 12 reaches zero going positive.

Transistor 103 is immediately turned off, permitting collector 113 to rise to a high potential. Transistor 129 turns on when collector 113 potential exceeds the breakdown voltage of Zener diode 125. When transistor 129 conducts, the potential of its collector 132 is reduced and the base drive applied by conductor 141 to the base of transistor 36 is removed. Thus, transistor 36 is turned off and the firing pulses supplied by firing circuit 14 render current-conducting group 11 conducting.

When transistor 103 of the multivibrator is turned off, transistor 104, of course, conducts and turns off transistor 135. With transistor 135 turned off, its collector 138 is raised to a high enough potential to drive switching transistor 37 into a conducting state. Thus, firing pulses provided by firing circuit 15 are diverted from the current-conducting group 12, rendering it effectively non-conducting.

The time interval between the zero crossing of the negative current and triggering of the multivibrator by application of a negative spike to its trigger input is varied by transistor 150 and in accordance with firing information from the negative group SCR's. Transistor 150 turns off each time a negative group SCR is fired and brings about the discharging of timing capacitor 76 to reset the timing network and the beginning of the unit time delay. If no negative group SCR is fired during the time delay interval, a negative spike triggers the multivibrator, initiating the blanking of negative group 12 and the unblanking of positive group 11. The "dead time" in the output current necessary to prevent intergroup short circuits and circulating currents is, thus, minimized in the same manner as described above in connection with switching cycloconverter output current from the positive to the negative group.

It should be noted that the circuit described above also operates without additional and cumulative delays to guard against unblanking a current-conducting group as a result of a false current zero. For example, when a cycloconverter is operating into a resistive load, the output current may fall momentarily to zero from its generally positive or negative value. The unit time delay provided by the circuit accommodates without a deleterious effect on the output current all false zero currents of shorter duration than the length of the delay.

The use of a fixed time delay only to mask false zero crossings from the group switching operation has been employed before. See, for example, United States Patent No. 3,320,515. The circuit of this patent also employs a second fixed time delay to seek to prevent intergroup short circuits and circulating currents. The two fixed time delays are cumulative, resulting in a total "dead time" in the cycloconverter output current greater than the maximum delay that may be experienced with the invention disclosed herein. In comparison, the invention disclosed herein provides more complete and effective protection against intergroup short circuits and circulating currents and interrupts the output current a generaly shorter interval of time, resulting in a better cycloconverter output.

Those skilled in the art will appreciate that various changes and modifications can be made in the apparatus

We claim:
1. In a power supply system having first and second groups of triggered rectifying devices arranged to conduct current in opposite directions for supplying an alternating current to a load, firing means associated with each of said groups for triggering the devices comprising its associated group,
  a signal-producing control means including time delay means for sensing zero load current in the system and the triggering of individual ones of said rectifying devices comprising each of said groups and for controlling the triggering of said rectifying devices on a group basis and, in response thereto, for blanking one of said groups of triggered rectifying devices from its associated firing means and for unblanking the other one of said groups from its associated firing means a predetermined fixed time interval after the current supplied to the load by said one of said groups becomes and remains substantially zero plus a variable time interval beginning when the current supplied the load by said one of said groups becomes and remains substantially zero and ending when the last one of said rectifying devices comprising said one of said groups is triggered before the end of a time period equal to said fixed time interval.

2. The combination according to claim 1 in which said signal-producing control means includes means for continuously alternately and oppositely blanking and unblanking said groups from their associated triggering means said predetermined fixed time interval plus said variable time interval after each current zero in said alternating load current.

3. The combination according to claim 2 in which said signal-producing control circuit means comprises
  multivibrator means responsive to trigger pulses and having a first state for connecting said first group of triggered rectifying devices to its associated firing means and disconnecting said second group of triggered rectifying devices from its associated firing means and a second state for connecting said second group of triggered rectifying devices to its associated firing means and disconnecting said first group of triggered rectifying devices from its associated firing means,
  current sensing means for detecting and indicating load current,
  first trigger pulse means connected to said multivibrator means through said time delay means and responsive to indications of said current sensing means and said firing means associated with said second group of triggered rectifying devices for triggering said multivibrator to said first state after said variable time delay provided by said time delay means,
  second trigger pulse means connected to said multivibrator means through said time delay means and responsive to indications of said current sensing means and said firing means associated with said first group of triggered rectifying devices for triggering said multivibrator to said second state after said variable time delay provided by said time delay means.

4. The combination according to claim 3 in which said time delay means comprises
  a first resistor-capacitor timing means associated with said first trigger pulse means and including a source of direct current potential for changing its capacitor,
  a first switch connected in parallel with said capacitor of said first resistor-capacitor means and responsive to the load current delivered by said second group to close and reset and discharge said capacitor whenever said lead current delivered by said second group is other than zero and whenever one of said rectiying devices comprising said second group is fired, and to open and permit said capacitor to charge when said load current delivered by said second group is zero and no one of said rectifying devices comprising said second group is being fired,
  a second resistor-capacitor timing means associated with said second trigger pulse means and including a source of direct current potential for charging its capacitor,
  a second switch connected in parallel with said capacitor of said second resistor-capacitor means and responsive to the load current delievered by said first group to close and reset and discharge said capacitor whenever said load currrent delivered by said first group is other than zero and whenever one of said rectifying devices comprising said first group is fired, and to open and permit said capacitor to charge when said load current delivered by said first group is zero and no one of said rectifying devices comprising said first group is being fired,
  said first trigger pulse means being responsive to the level of charge of said first capacitor for providing a trigger pulse to said multivibrator when the charge on said first capacitor reaches a predetermined level, and
  said second trigger pulse means being responsive to the level of charge of said second capacitor for providing a trigger pulse to said multivibrator when the charge on said second capacitor reaches a predetermined level.

5. In a cycloconverter system having a supply circuit, an output circuit, and a pair of current-conducting groups each comprising a plurality of switching and rectifying devices responsive to firing pulses to conduct current through the group, said pair of current-conducting groups being connected in parallel with each other between and back-to-back with respect to said supply and output circuits for alternately conducting current from said supply circuit to said output circuit in response to firing pulses supplied to said switching and rectifying devices comprising one of said pair of current-conducting groups and from said output circuit to said supply circuit in response to firing pulses supplied to said switching and rectifying devices comprising the other of said pair of current-conducting groups to provide alternating cycloconverter output current, and a firing circuit means associated with and for supplying firing pulses to said switching and rectifying devices comprising each of said current-conducting groups, the combination with said current-conducting groups and their associated firing circuits of current-controlling means responsive to the output current supplied by said current-conducting groups and to firing pulse information from said current-conducting groups for insuring that only one of said pair of current-conducting groups conducts at one time, said current-controlling means comprising
  sensing means for sensing the current conducted by each of said groups and for providing signals indicating and corresponding thereto,
  variable time delay means connected to said sensing means to receive the signals provided thereby and connected to said current-conducting groups to receive firing signal information therefrom and including timing means, all for providing an output pulse associated with each of said current-conducting groups and indicating a non-conducting condition of its associated group, each of said output pulses being provided at the end of a variable time interval comprising the sum of a fixed time interval and a variable time interval of less duration than said fixed time interval and beginning when said group associated with said output pulse becomes non-conducting and ending with the first firing of a switching and rectifying device comprising said associated group occurring thereafter and within a period corresponding to said fixed time interval, firing pulse blanking means responsive to blanking and unblanking signals and associated with each of said groups and its firing circuit for permitting and preventing firing pulses to reach each of said groups, group switching circuit means interconnecting each of said firing pulse blanking means and said variable time delay means and responsive to time delayed output signals therefrom indicating which one of said groups becomes non-conducting for providing blanking signals to said firing pulse blanking means associated therewith and for terminating blanking signals being supplied said firing pulse blanking means associated with the corresponding other one of said groups.

6. The combination according to claim 5 in which said variable time delay means comprises a resistor-capacitor timing means including a source of direct current potential for charging its capacitor associated with each of said current-conducting groups, a switch associated in shunting relationship with each of said capacitors of said resistor-capacitor means and responsive to the load current delivered by its associated current-conducting group to close and shunt its associated capacitor whenever said load current delivered by its associated current-conducting group is other than zero and whenever one of said switching and rectifying devices comprising its associated current-conducting group is fired, and to open and permit its associated capacitor to charge when said load current delivered by its associated current-conducting group is zero and no one of said switching and rectifying devices comprising its associated current-conducting group is being fired, and output pulse signal means associated with each of said resistor-capacitor means for providing a time delayed output signal to said group switching means when the charge on its associated capacitor reaches a predetermined level.

References Cited
UNITED STATES PATENTS

| | | | |
|---|---|---|---|
| 3,119,058 | 1/1964 | Genuit | 321—18 XR |
| 3,320,514 | 5/1967 | Lawrence | 321—45 |
| 3,320,515 | 5/1967 | Amato et al. | 321—45 |

JOHN F. COUCH, Primary Examiner

W. M. SHOOP, Jr., Assistant Examiner

U.S. Cl. X.R.

321—45